Figure 1:
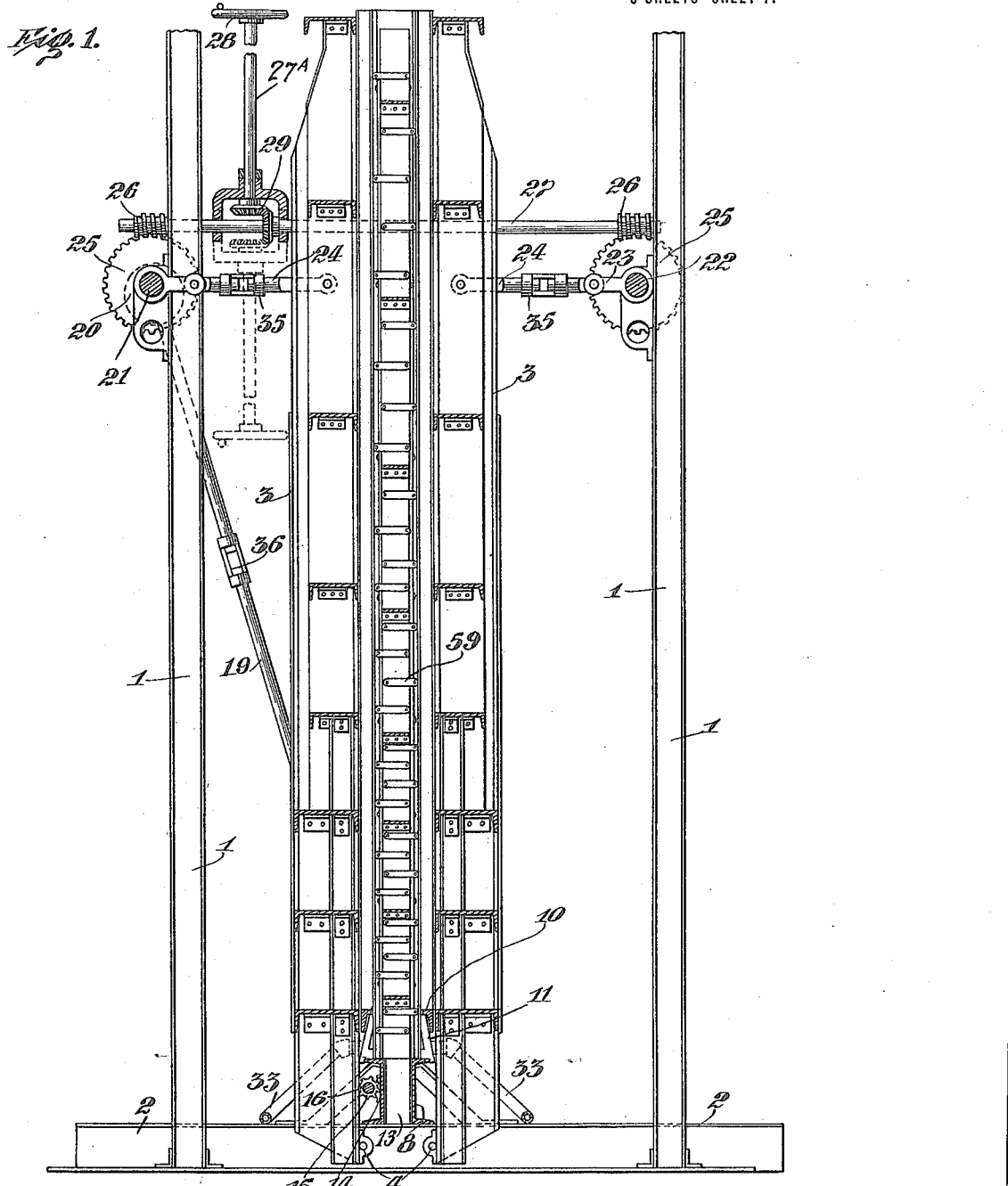

G. ATTERBURY.
APPARATUS FOR MOLDING OR CASTING.
APPLICATION FILED SEPT. 10, 1910.

1,207,698.

Patented Dec. 12, 1916.
6 SHEETS—SHEET 3.

WITNESSES:
C. S. Ashley
John W. Peters

INVENTOR
Grosvenor Atterbury
BY
Betts Sheffield Bentley Betts
his ATTORNEYS

G. ATTERBURY.
APPARATUS FOR MOLDING OR CASTING.
APPLICATION FILED SEPT. 10, 1910.
1,207,698.
Patented Dec. 12, 1916.
6 SHEETS—SHEET 4.
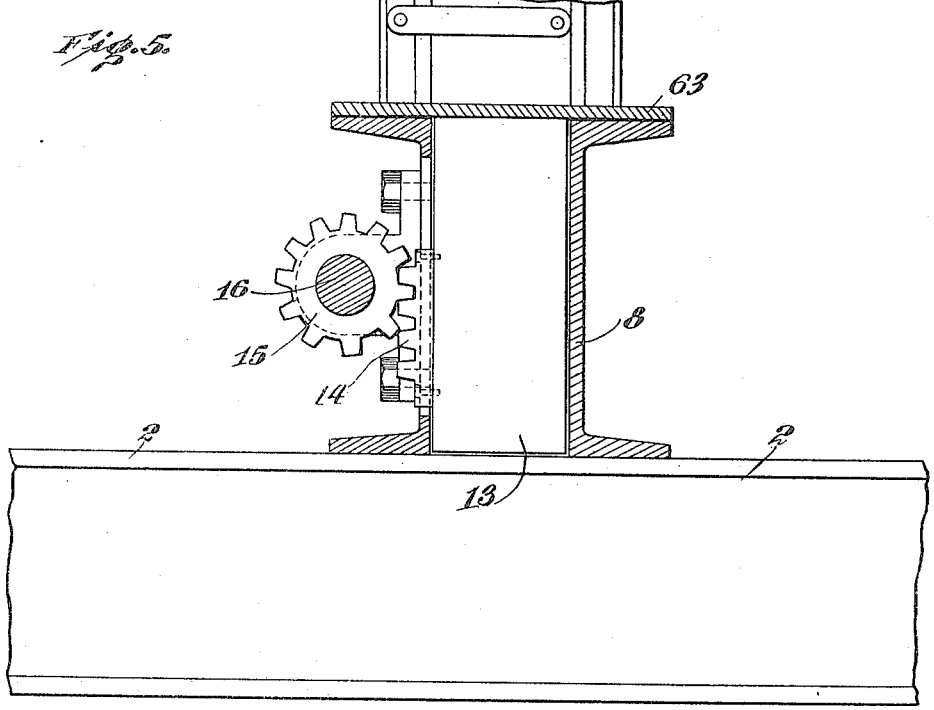
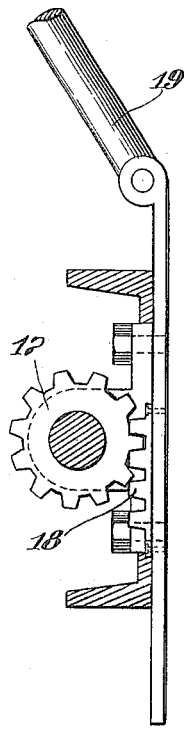
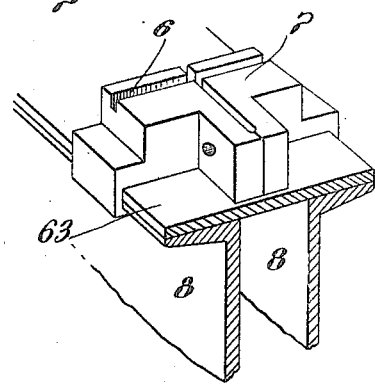
WITNESSES:
C. S. Ashley
John W. Peters
INVENTOR
Grosvenor Atterbury
BY Betts Sheffield Bentley Betts
his ATTORNEYS

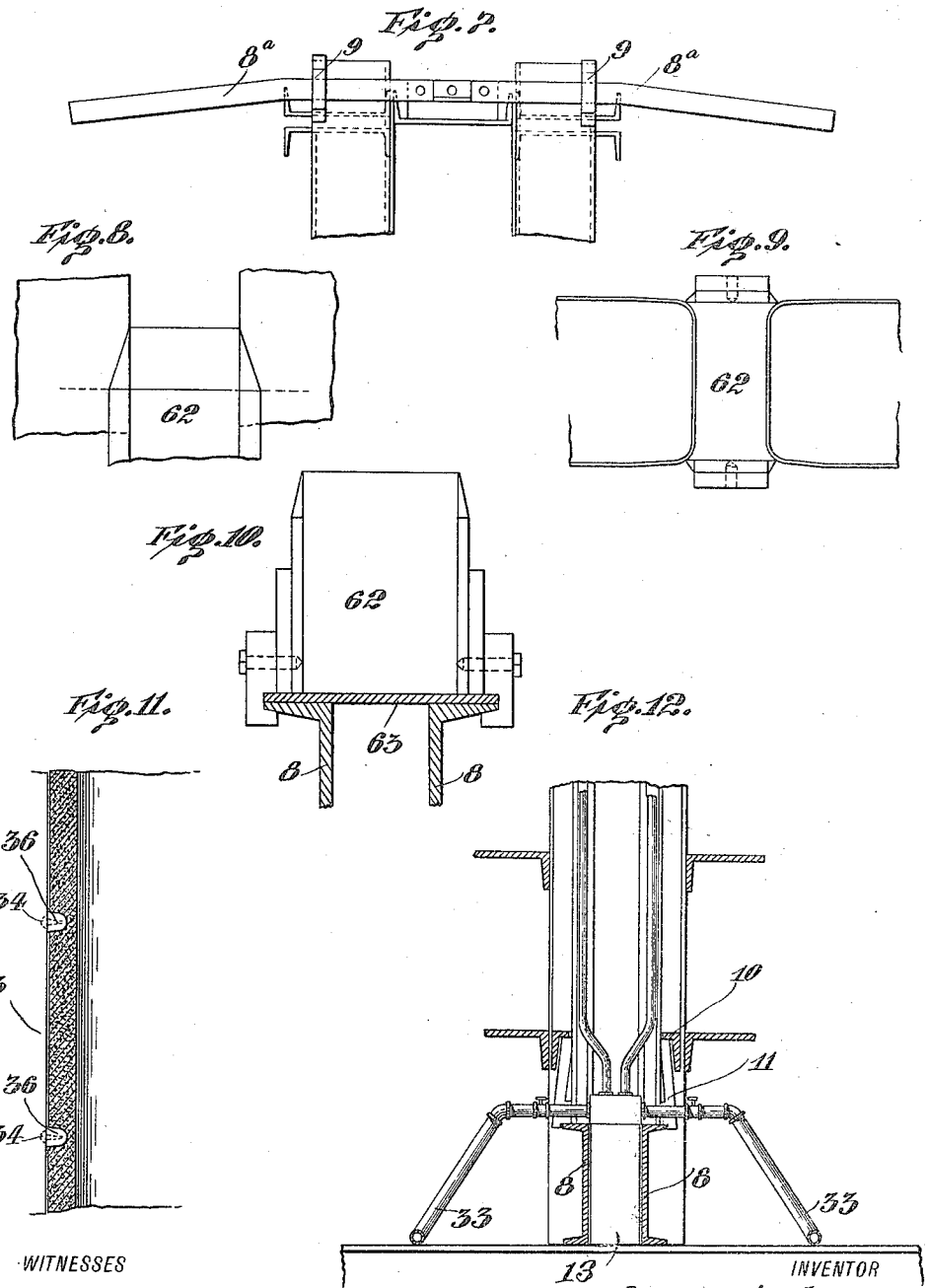

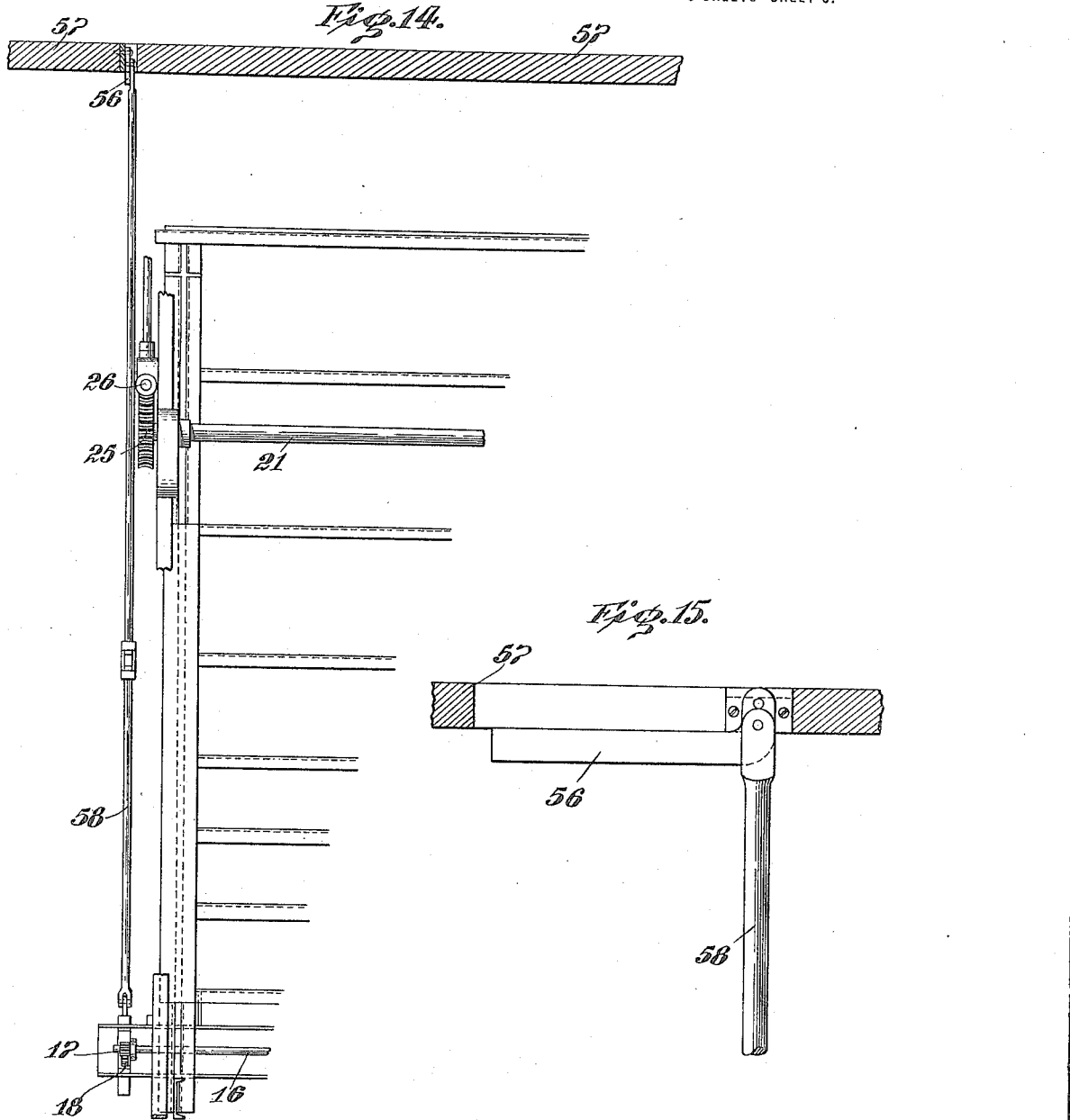

UNITED STATES PATENT OFFICE.

GROSVENOR ATTERBURY, OF NEW YORK, N. Y.

APPARATUS FOR MOLDING OR CASTING.

1,207,698. Specification of Letters Patent. Patented Dec. 12, 1916.

Application filed September 10, 1910. Serial No. 581,343.

*To all whom it may concern:*

Be it known that I, GROSVENOR ATTERBURY, a citizen of the United States, and a resident of the borough of Manhattan, city, county, and State of New York, have invented certain new and useful Improvements in Apparatus for Molding or Casting, of which the following is a specification.

My invention relates to apparatus for molding or casting concrete or cementitious blocks or sections having voids therein, and adapted for use in building houses or other structures.

The objects of my invention are to provide an apparatus or mold which will be strong and durable, easily manipulated and readily adjustable, for the casting of blocks of any desired dimensions. Also to provide in such a mold means for locating plugs of soft material in the concrete blocks, adapted to receive nails or screws.

A still further object is to incorporate in such mold means for heating the block and thereby hastening the preliminary setting of the material, so that the block can be removed from the mold shortly after casting, thereby increasing the number of blocks or sections which may be made in a single mold.

Other objects, advantages and benefits of my improved apparatus will be obvious from the following description.

In the drawings accompanying and forming a part of this specification, I have illustrated one embodiment of my improved apparatus.

Figure 2:
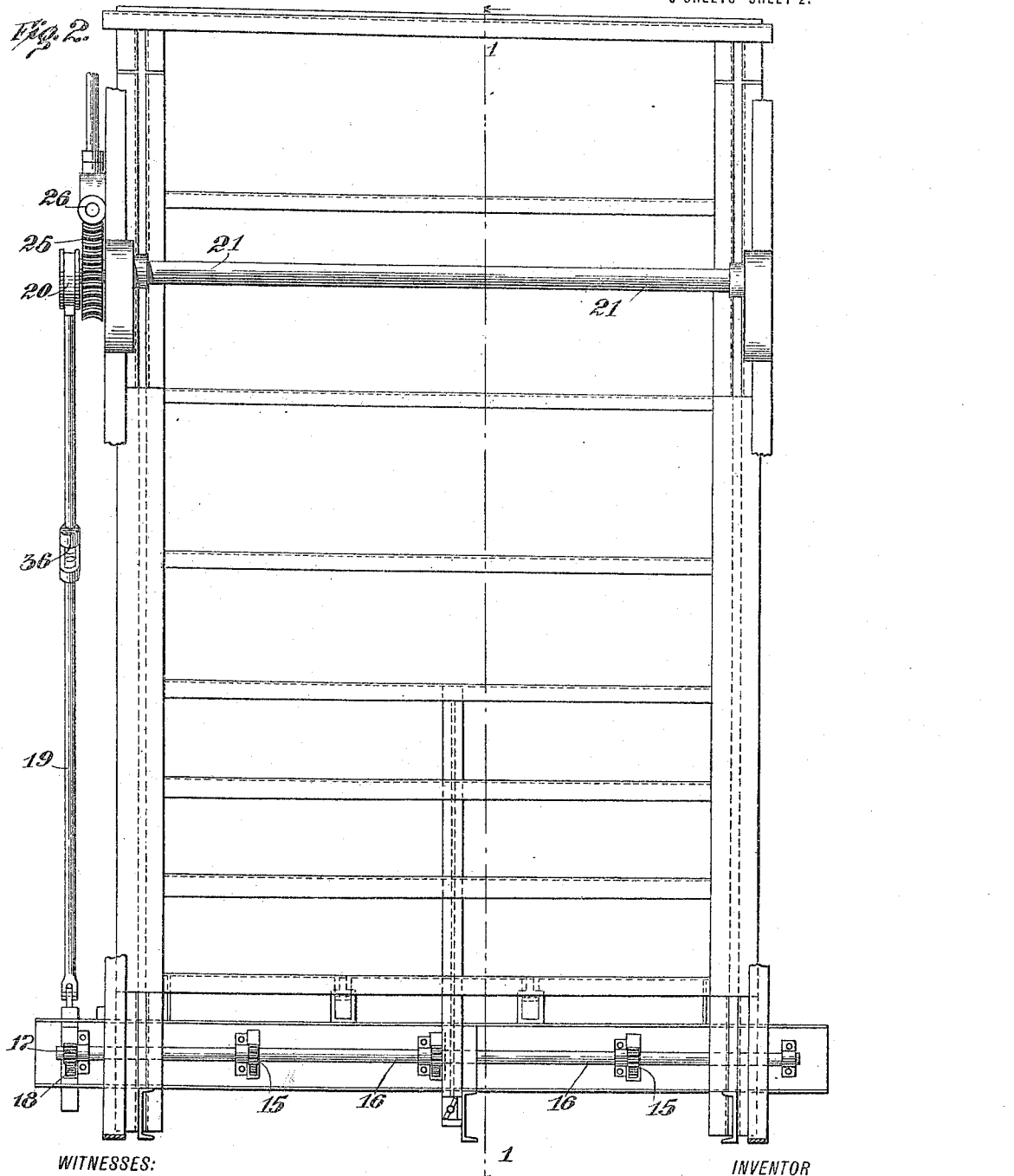
Figure 3:
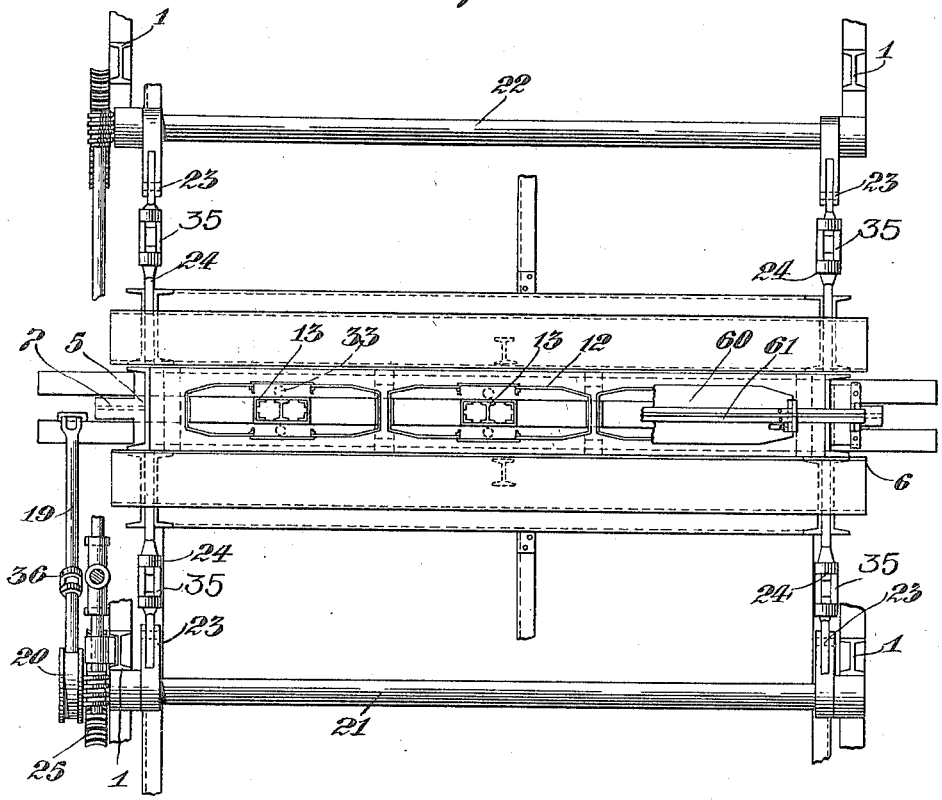
Figure 4:
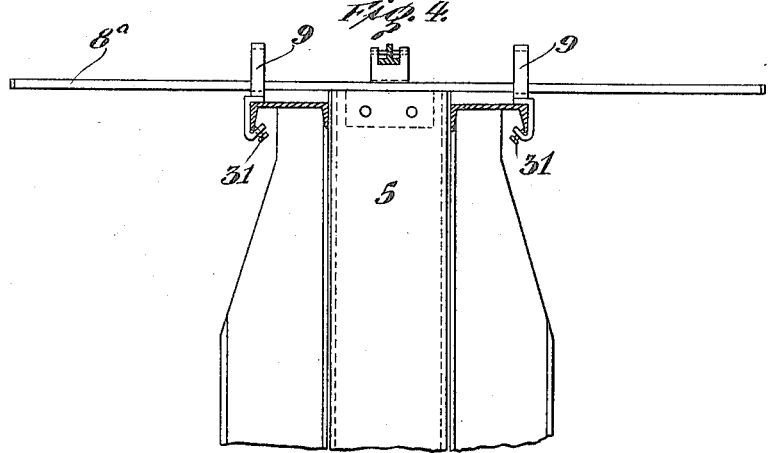

In these drawings Figure 1 is a sectional view of one embodiment of my improved casting apparatus taken on line 1—1 of Fig. 2. Fig. 2 is a side elevation. Fig. 3 is a top plan view with core covers partly broken away. Fig. 4 is a detail view showing the means whereby the end walls are opened and closed. Fig. 5 is a detail view showing the rack and pinion and connecting mechanism for expanding and collapsing the cores. Fig. 6 is a detail view of the means for operating the rack and pinion shown in Fig. 5. Fig. 7 is a plan view of the mechanism shown in Fig. 4. Fig. 8 is a detail view of a portion of the lower ends of two cores, showing the adjustable projections for forming lifting recesses in the block. Fig. 9 is a plan view of the structure shown in Fig. 8. Fig. 10 is a detail view showing the means for securing in place the plugs or projections shown in Figs. 8 and 9. Fig. 11 is a detailed fragmentary view of a portion of the core and the block cast therein, showing the manner in which I secure in the block the nail or screw plugs. Fig. 12 is a detail view showing means of introducing the steam into the cores. Fig. 13 is a detail view showing the adjustable means for securing the lower ends of the end walls in position. Figs. 14 and 15 are detail views showing mechanism for operating the cores independently of the side walls.

The same reference numerals are used throughout the several views, to designate the same parts. The apparatus comprises fixed upright members 1, secured at their lower ends to the transverse members 2. The mold box proper comprises side walls 3, secured by hinges 4 to the transverse supporting members 2. End walls are provided and at their lower ends (see Fig. 13) rest in recesses 6 in the members 7, which are adjustably secured to the channel irons supporting members 8. The upper ends of the end walls carry elongated members 8ª, which have their ends bent in a horizontal plane, as shown in Fig. 7. The ends of the members 8ª are adapted to slide in the brackets or guides 9, which are adjustably secured to the upper ends of the side walls 3, and the arrangement is such that when the side walls are opened the top of the end wall will be drawn back or opened by the curved or bent members 8ª sliding in the brackets 9.

The bottom of the mold box consists of a vertically adjustable plate 10 resting on removable supports 11, which may be of any desired height. These in turn rest on the horizontal supports 8. The block is formed directly on the upper face of the plate 10 and the latter is removed with the newly formed block which remains on the plate until it has sufficiently hardened to be removed therefrom.

A series of hollow, collapsible cores 12 are provided in the mold (see Fig. 3), each of which has a center member 13, connected with the retractable side plates of the core by links 59, so that when the center member is adjusted vertically, it will contract or expand the core. The tops of the cores are closed by covers 60, one of which is shown in Fig. 3. A bar 61 extends along the top of the box and is fastened to the ends of the covers and to the end walls 5, and serves to keep these parts in position. The lower ends of the cores extend down through the bottom plate and rest on plate 63 supported by the members 8, (Fig. 5). The center members 13 of the cores extend between the supports 8, and each bears a rack 14 in engagement with a pinion 15, mounted on a shaft 16. The shaft 16 also bears a pinion 17 in mesh with the rack 18 attached to the lower end of the rod 19, which latter, at its upper end terminates in an eccentric 20 mounted on a shaft 21. The arrangement is such that when the shaft 21 is rotated, moving with it the eccentric 20, the cores are contracted or expanded by reason of the rotation of the pinion 15 and the movement of the racks 14. A horizontal shaft 22 is provided and is mounted on the upright members 1 in the same manner as is the corresponding shaft 21 on the other side of the mold box. Each of these shafts 21 and 22 have mounted thereon arms 23, hinged at their outer ends to members 24 secured to the sides 3. The shafts 21 and 22 each bear worm wheels 25, which mesh with the endless screws or worm gears 26 mounted on the ends of the rotatable shaft 27. The shaft 27<sup>A</sup> carries an operating or hand wheel 28 which is adapted to rotate the shaft 27 through the bevel gears 29.

Plugs 62 are placed between the lower ends of the cores for forming lifting recesses in the blocks. These are secured to the members 8 and rest on the plate 63 on top of the same.

The shaft 27<sup>A</sup> carrying the hand wheel 28 is pivoted to the shaft 27 so that it may be rotated into the position shown in dotted lines in Fig. 1, or into any intermediate position. This is desirable because it is frequently necessary to operate the apparatus from the ground instead of from a position above the apparatus. When the hand wheel 28 is rotated, it rotates the shaft 27, which in turn, through the worm wheels 25, rotates the shafts 21 and 22. These shafts cause the arms 23 to oscillate or rotate, and either draw in or thrust out the members 24. It is desirable that when the box is closed the arms 23 and the arms 24 should be in the straight line position shown in Fig. 1, in which position they are better able to withstand the strain or thrust caused by the material in the box.

In casting blocks of this kind, it is frequently desirable to incorporate in the block plugs of soft material such as wood or asbestos composition, adapted to receive screws or nails. In order that these plugs may be easily incorporated in the block, I provide pins 34 (see Fig. 11) secured to the inner plates of the side walls 3. These pins are adapted and intended to receive the plugs 36 and to hold them in position until the block has been formed and the mold is opened. When this has taken place, the pins are withdrawn by the movement of the walls 3 from the plugs, which remain in position in the block and may be used to receive nails or screws for securing in place molding, or for other similar purposes.

It will be noted that the members or arms 24 are each provided with a turn buckle or adjusting device 35, and that a similar adjusting device 36 is provided in connection with the operating arm 19. These adjusting devices are necessary since all of these members are operated from a single operating device 28 and it is necessary to time them all to operate in unison.

The operation of the device is as follows: The box is adjusted to form a block of the desired size, by moving inwardly or outwardly the end walls 5, which operation is accomplished by sliding inwardly or outwardly the members 7 which engage and hold the lower ends of the end walls and by adjusting the slides 9 (see Fig. 4) to their proper position on the upper edges of the side walls, which adjustment is readily accomplished by means of the set screws 31. Also by raising or lowering the bottom plate 10 and supporting it on the supports 11, of suitable height. When these adjustments have been made and the mold closed, the material to form the block is placed in the mold. Steam is then applied to the inside of the cores through the pipes 33, and in a short time—depending upon the condition of the material and the size of the block—it will have hardened sufficiently to permit its removal. The attendant then operates the hand wheel 28 which operation withdraws the side walls 3 and the end walls 5 and collapses the cores in the manner hereinbefore described. After the block has been formed and hardened sufficient for removal, the covers of the cores and the bar 61 connecting them are then removed and the block is removed on the plate 10 by means of any suitable lifting device, and left standing, in order that the hardening may be completed. It is to be understood that the cores remain in the mold and because they are collapsed they do not interfere with the removal of the block. Another bottom plate is then inserted and the operation repeated.

In Figs. 14 and 15 I have illustrated modified mechanism for opening and closing the cores. In these figures the rack 18 is connected to a rod 58, operated by a lever 56 pivoted to the fixed member 57. With this arrangement the cores may be expanded and collapsed independently of the side walls.

While my improved casting apparatus is designed and specially intended for blocks of large size, yet it may be used to advantage in forming blocks of relatively small size, and may also, by inserting suitable partitions, be used for forming several blocks or sections at one operation. In some cases cores not collapsible and sand cores, such as those described in my pending application, Serial No. 521,664, may be used with the box above described.

I am aware that many modifications can be made in the apparatus above described by those skilled in the art without departing from the spirit of my invention or the scope of my claims.

What I claim is:

1. In a mold of the kind described, movable side and end walls, a collapsible core comprising a longitudinally adjustable center member, an operating device controlled by a single operating handle, means connecting the side and end walls and the center member with said operating device, and means positively connecting the center member with the walls of the core whereby the movement of the operating device simultaneously opens or closes said walls and contracts or expands the core, substantially as described.

2. In a mold of the kind described, movable side and end walls, a collapsible core comprising a longitudinally adjustable center member, an operating device controlled by a single operating handle, adjustable means connecting the side and end walls and the center member with said operating device, and means positively connecting the center member with the walls of the core whereby the movement of the operating device simultaneously opens or closes said walls and contracts or expands the core, substantially as described.

3. In a mold of the kind described, a movable side wall, a rotatable shaft, a crank thereon, a rod connected at one end to said crank and at the other end to said wall, a worm gear on said shaft, and an operating device arranged to rotate said shaft and thereby to move said wall and open and close said wall, said operating device including a worm meshing with said worm gear, substantially as described.

4. In a mold of the kind described, movable side and end walls, a series of vertical cores supported at their lower ends on the base of the mold, a removable bar having a series of core supporting covers for said cores secured thereto and arranged to steady the upper ends of the cores, the ends of said bar being adjustably secured to said end walls.

5. In a mold of the kind described, a frame, side walls hinged thereto at their lower ends, end wall-supporting members adjustably secured to said frame, end walls having their lower ends secured to said adjustable members by a hinged connection, adjustable guides mounted on and arranged to be moved along the upper edges of said side walls and a transversely disposed member secured to each of the upper ends of the end walls and having an inclined surface in sliding engagement with said adjustable guides, whereby the movement of the side walls effects a corresponding movement of the end walls, substantially as described.

6. In a mold of the kind described, movable side and end walls, a collapsible core, an operating device comprising a shaft and hand wheel, and means connected therewith whereby the side and end walls may be opened or closed and the core contracted or expanded at one operation, said operating device being pivoted at the end opposite the hand wheel so that it may be operated from either above or below the top of the mold, substantially as described.

GROSVENOR ATTERBURY.

Witnesses:
FREDERICK W. MAGDEBURG,
JOSEPH P. MARSHALL.